US012654463B2

(12) United States Patent
Zanasi et al.

(10) Patent No.: US 12,654,463 B2
(45) Date of Patent: Jun. 16, 2026

(54) INK RECIRCULATING SYSTEM FOR AN INKJET PRINTER

(71) Applicant: ZANASI S.R.L., Sassuolo (IT)

(72) Inventors: Andrea Zanasi, Sassuolo (IT); Alessio Giovannini, Sassuolo (IT)

(73) Assignee: ZANASI S.R.L., Sassuolo (IT)

( * ) Notice: Subject to any disclaimer, the term of this patent is extended or adjusted under 35 U.S.C. 154(b) by 263 days.

(21) Appl. No.: 18/120,009

(22) Filed: Mar. 10, 2023

(65) Prior Publication Data

US 2023/0286287 A1 Sep. 14, 2023

(30) Foreign Application Priority Data

Mar. 10, 2022 (IT) ........................ 102022000004577

(51) Int. Cl.
*B41J 2/18* (2006.01)
*B41J 2/175* (2006.01)

(52) U.S. Cl.
CPC ............. *B41J 2/18* (2013.01); *B41J 2/17506* (2013.01); *B41J 2/17563* (2013.01); *B41J 2/17596* (2013.01)

(58) Field of Classification Search
None
See application file for complete search history.

(56) References Cited

U.S. PATENT DOCUMENTS

| | | | | | |
|---|---|---|---|---|---|
| 2,413,420 | A * | 12/1946 | Stephanoff | B01J 19/26 159/48.1 |
| 6,551,518 | B2 * | 4/2003 | Gargas | C02F 1/78 210/764 |
| 10,647,122 | B2 * | 5/2020 | Ribeiro | B41J 2/195 |
| 12,128,009 | B1 * | 10/2024 | Lyons | A61J 9/04 |

FOREIGN PATENT DOCUMENTS

EP 2670601 B1 6/2019

* cited by examiner

*Primary Examiner* — Alejandro Valencia
(74) *Attorney, Agent, or Firm* — Dickinson Wright PLLC; Andrew D. Dorisio

(57) ABSTRACT

An ink recirculating system for an inkjet printer includes an ink tank having a cavity having a lower side wall converging towards a bottom and closing wall of the tank, of a decreasing cross-section; an outlet duct for ink inside the cavity and coaxial to a longitudinal axis of the tank, and an inlet opening above and near the bottom and closing wall; a first duct with an end portion having an opening for supplying ink to the tank provided in the lower portion of the tank; a pump to pump ink from the outlet duct to the inlet duct, the end portion being substantially tangent to a portion of a circular sector of the side wall of the lower portion of the tank, to create a substantially swirling flow in the ink and a mixing of the ink or the components thereof.

25 Claims, 11 Drawing Sheets

INK RECIRCULATING SYSTEM FOR AN INKJET PRINTER

This application claims priority to Italian Patent Application No. 102022000004577 filed on Mar. 10, 2022, the disclosure of which is hereby incorporated by reference.

TECHNICAL FIELD

The present invention relates to an ink recirculating system for an inkjet printer, according to the pre-characterizing part of the main claim.

BACKGROUND

In inkjet printers providing a homogeneous and constant ink feed to the printhead is critical.

When using pigmented inks, it may happen that pigment particle sediments form in the ink tank of the printer's ink recirculating system, which can change the characteristics of the ink supplied to the printhead and can: cause uneven printing, and/or a decrease in the print contrast, and/or cause one or more printhead nozzles to become clogged.

Furthermore, above all, when dye-based inks are used, it is advisable to eliminate or reduce as much as possible the air bubbles in the ink; which air bubbles, if they reach the printhead, can affect its functioning and/or print quality, and can also cause ink to accidentally leak from the ink tank of the ink recirculating system.

Ink recirculating systems for an inkjet printer, which try to solve the problems set out above have long been known.

For example EP2670601A1 describes an ink circulation system for a continuous ink jet printer comprising a tank in which a substantially vertical flow is generated, by moving the ink through a first vertical conduit which includes an opening provided on the bottom surface of the tank and a second vertical conduit which includes an opening at a location above the tank.

SUMMARY

The object of the present invention is to provide an ink recirculating system for an inkjet printer, which is alternative to those of the prior art, and which comprises an ink tank which includes means for the ink inlet and the outlet in the tank, adapted to guarantee an ink leaving the tank which has homogeneous and constant characteristics. A further object is to provide an ink recirculating system which includes an ink tank which is simple to make and which has a limited number of components which can be assembled and/or disassembled, for example for maintenance reasons, quickly and easily.

A further object is to provide an ink recirculating system which allows to use different types of ink, and in particular both pigmented inks and dye-based inks, and/or water-based or solvent-based inks.

These and other objects which will be evident to the person skilled in the art are achieved by an ink recirculating system for an inkjet printer according to the characterizing part of the attached claims.

BRIEF DESCRIPTION OF THE DRAWINGS

For a better understanding of the present invention, drawings are attached, by way of non-limiting example, in which.

DETAILED DESCRIPTION

Figure 1:
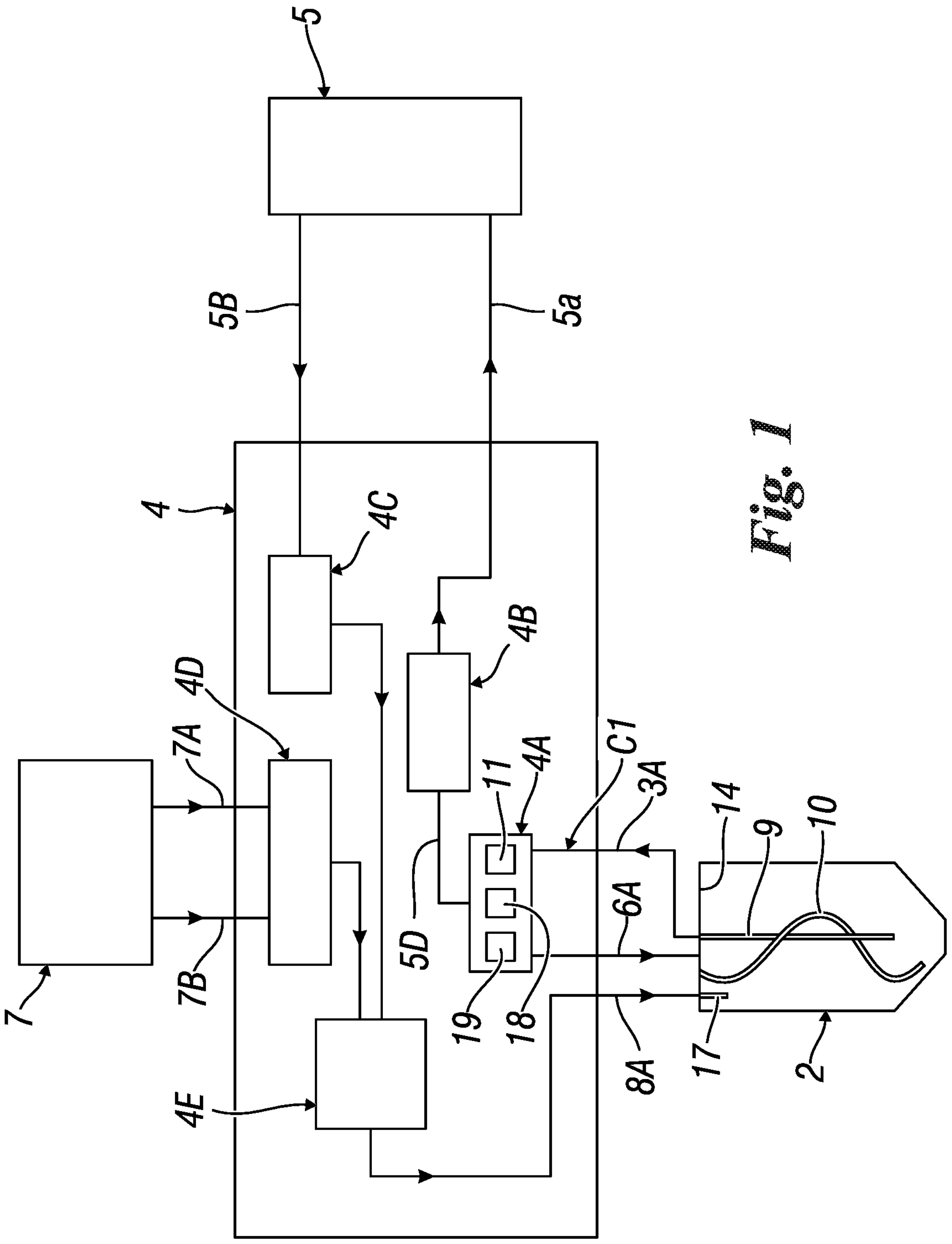
FIG. 1 is a schematic diagram of an ink recirculating system for a continuous inkjet printer (CIJ) according to the invention.

With reference to FIG. 1, it illustrates schematically an ink recirculating system 1 for an inkjet printer, comprising: a tank 2 for said ink, a connecting module 4, a printhead 5 and a module 7 for refilling the tank 2.

The tank 2 comprises, as usual for the person skilled in the art, an outlet line 3A for the ink outlet from the tank 2 in which it is contained, which is connected through the connecting module 4:

- to the printhead 5 to which it supplies, when required, the ink necessary for printing through an inlet line 5A,
- and to the tank 2, for recirculating the ink present in the tank, through a first inlet line 6A for the ink inlet into the tank 2, so as to move the ink present in the tank and standardize its characteristics.

The tank 2 further comprises, as usual for the person skilled in the art, a second inlet line 8A which is connected through the connecting module 4:

- to one or more lines 7A, 7B coming out of a module 7 adapted to supply the tank 2 with the ink and/or the components thereof, consumed during printing, so as to always keep the tank at a predetermined filling level,
- to a line 5B coming out of the printhead 5 to recirculate the ink not used for printing, if the printhead is of the continuous jet type.

More specifically, as usual for the person skilled in the art, the ink outlet line 3A is connected to the line 6A for the ink inlet in the tank by a first connecting sub-module 4A of the connecting module 4, which comprises: a pump 11 for recirculating the ink, and preferably also a filtering device 18 and a valve member 19, comprising for example a hydraulic limiter, adapted to direct the ink back into the tank 2, through the inlet line 6A, and/or to direct a part thereof to the printhead 5, through a second connecting sub-module 4B, also of the usual type for the person skilled in the art, not described in detail below.

The connecting module 4 also comprises further sub-modules 4C-4E, for the management of the connections of the ink recirculation from the printhead 5, for the management of the module 7 for refilling of the tank 2, and for the management of the power supply 8A, also these sub-modules, being of the conventional type for the person skilled in the art, will not be further described.

Figure 2A:
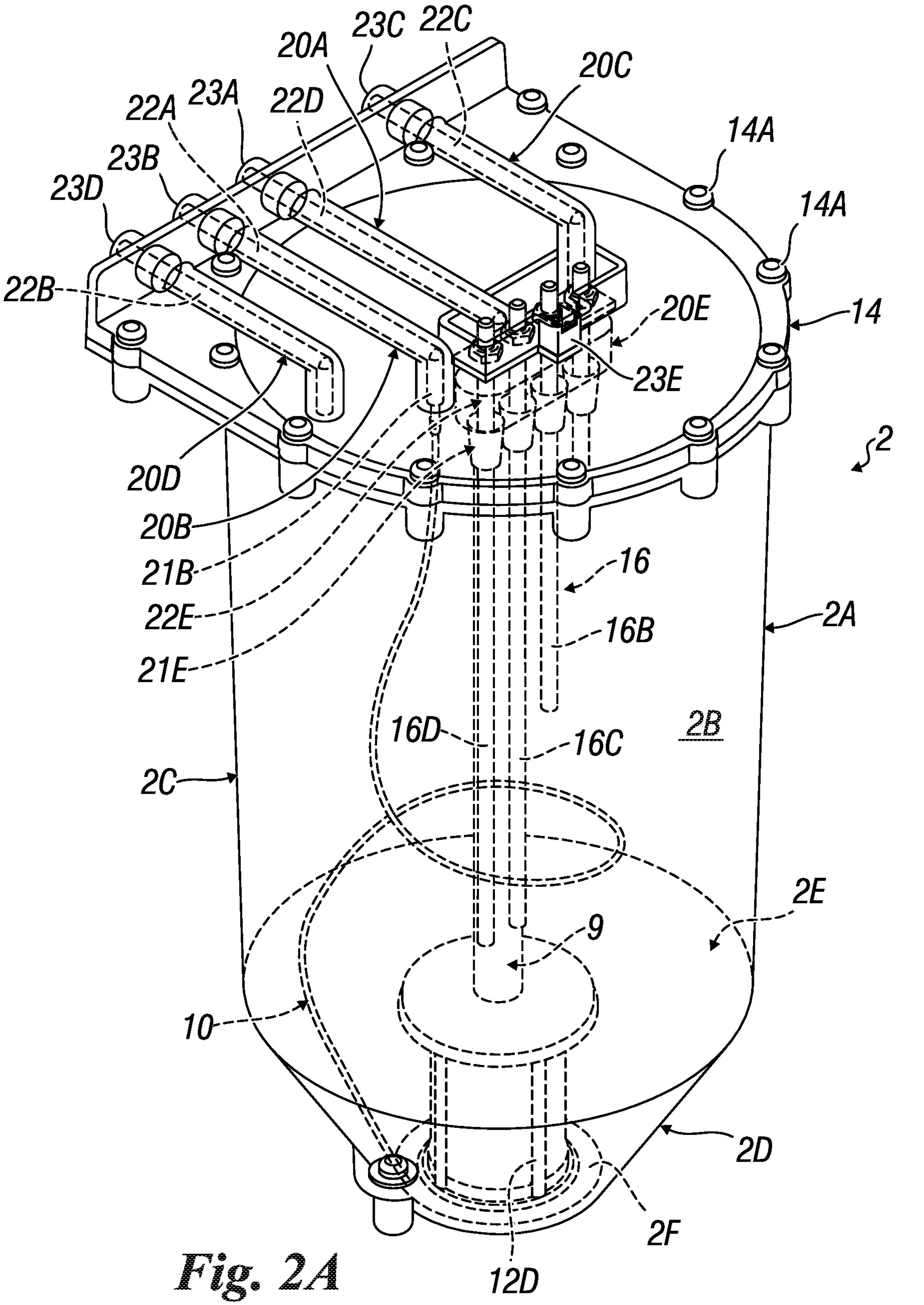
FIGS. 2A-B are two schematic views of a tank according to the invention of the system of FIG. 1, taken from two different perspectives, and in which the walls of the tank have been represented as if they were transparent, so that the components included inside the tank can be viewed.
Figure 3:
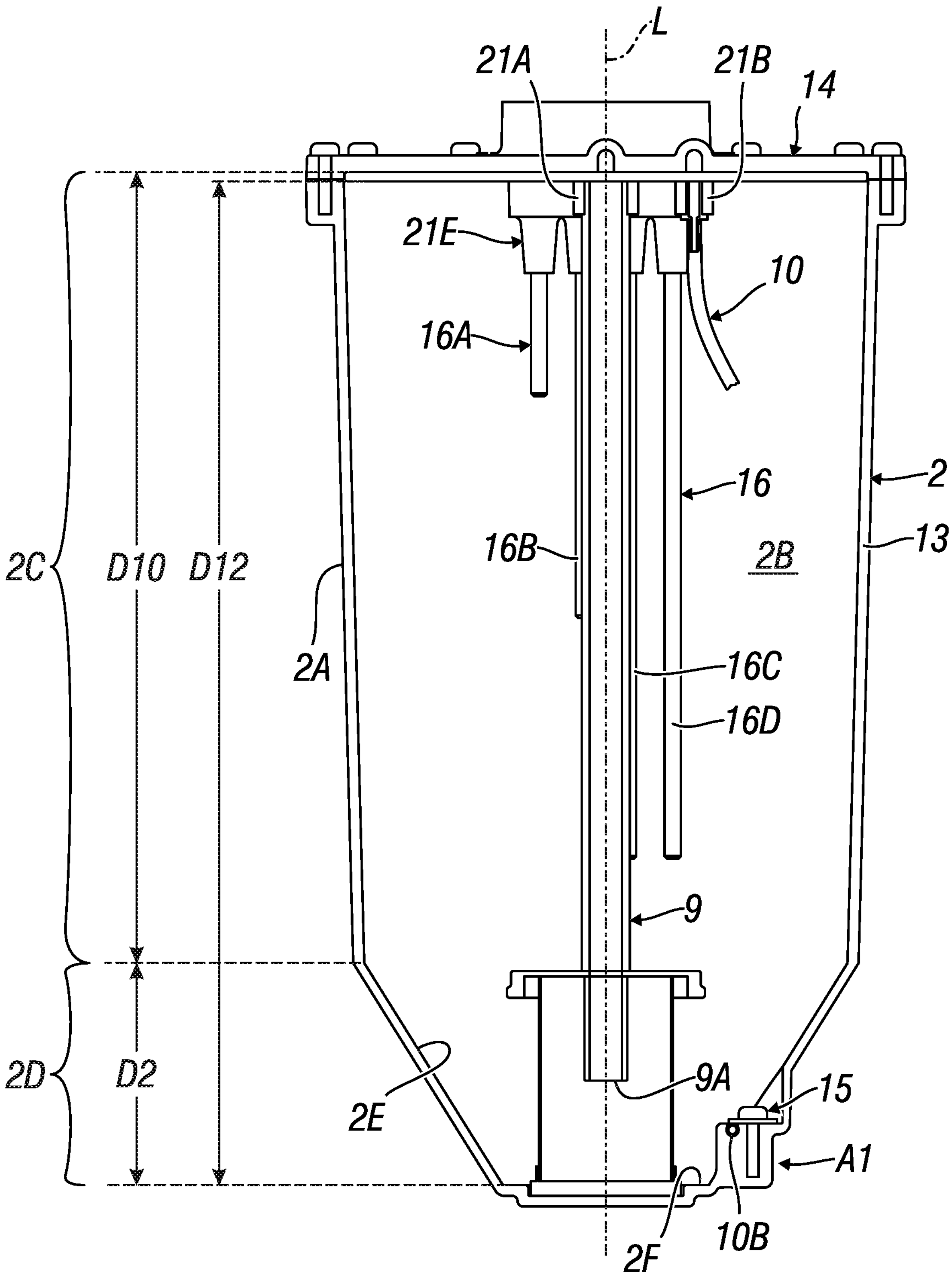
FIG. 3B is a schematic perspective view of the detail indicated by the arrow A3 of FIG. 3A.

The tank 2 of the recirculating system 1 comprises: a body 2A delimiting a cavity 2B (FIG. 2A) which has an upper 2C and a lower 2D (FIG. 3) portion. The lower portion 2D comprises a convergent-shaped side wall 2E, which converges towards a bottom and closing wall 2F of the tank, and has a decreasing cross-section.

The tank 2 comprises an outlet duct 9 for the ink outlet from the tank, provided inside the cavity 2B of the tank 2 and comprises an inlet opening 9A for the inlet of the ink to be moved out of the tank, provided above and near said bottom and closing wall 2F.

Figure 5:
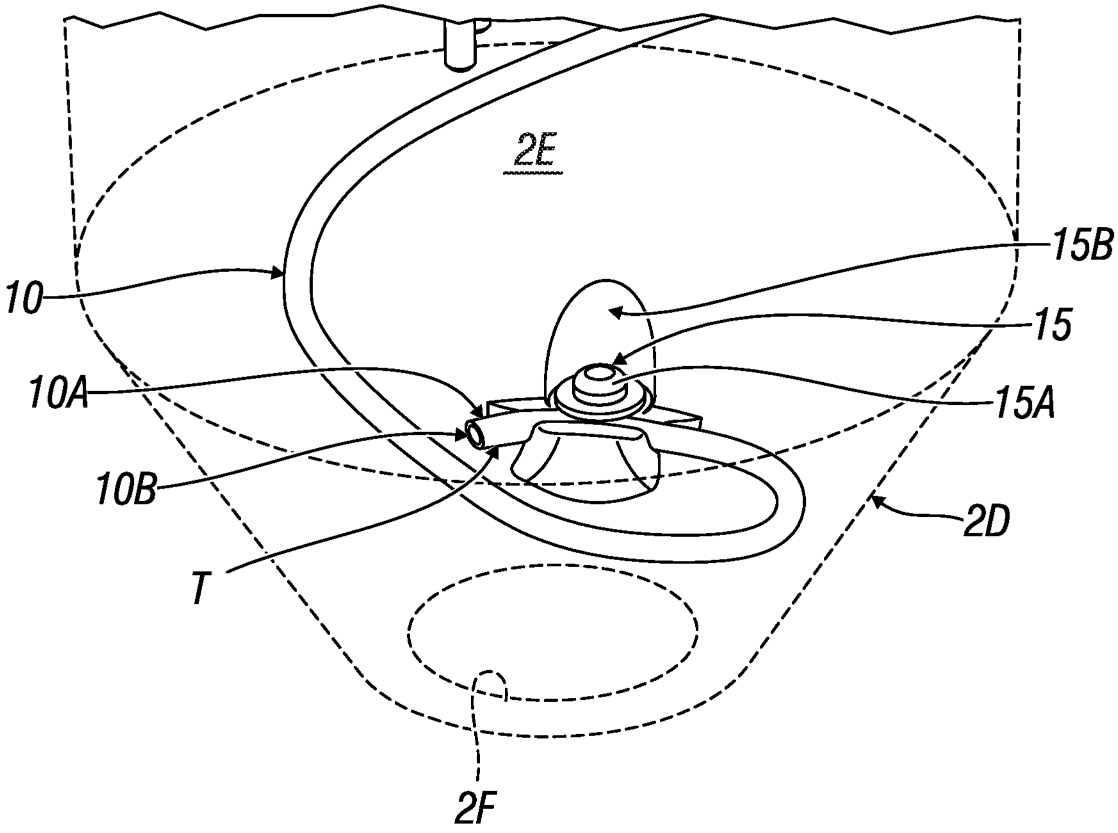
FIGS. 5 and 6 are two simplified schematic views, one in perspective and one from above, of the lower part of the tank in FIG. 2, in FIG. 5 some of the tank components have been omitted.

The tank also comprises a first inlet duct 10 for the inlet in the tank 2 of the ink to be mixed, comprising an end portion 10A (FIG. 5) having an opening 10B for the ink supply to the tank 2. The end portion 10A of the duct 10 is provided in the convergent-shaped part of the lower portion of the tank.

Figure 6:
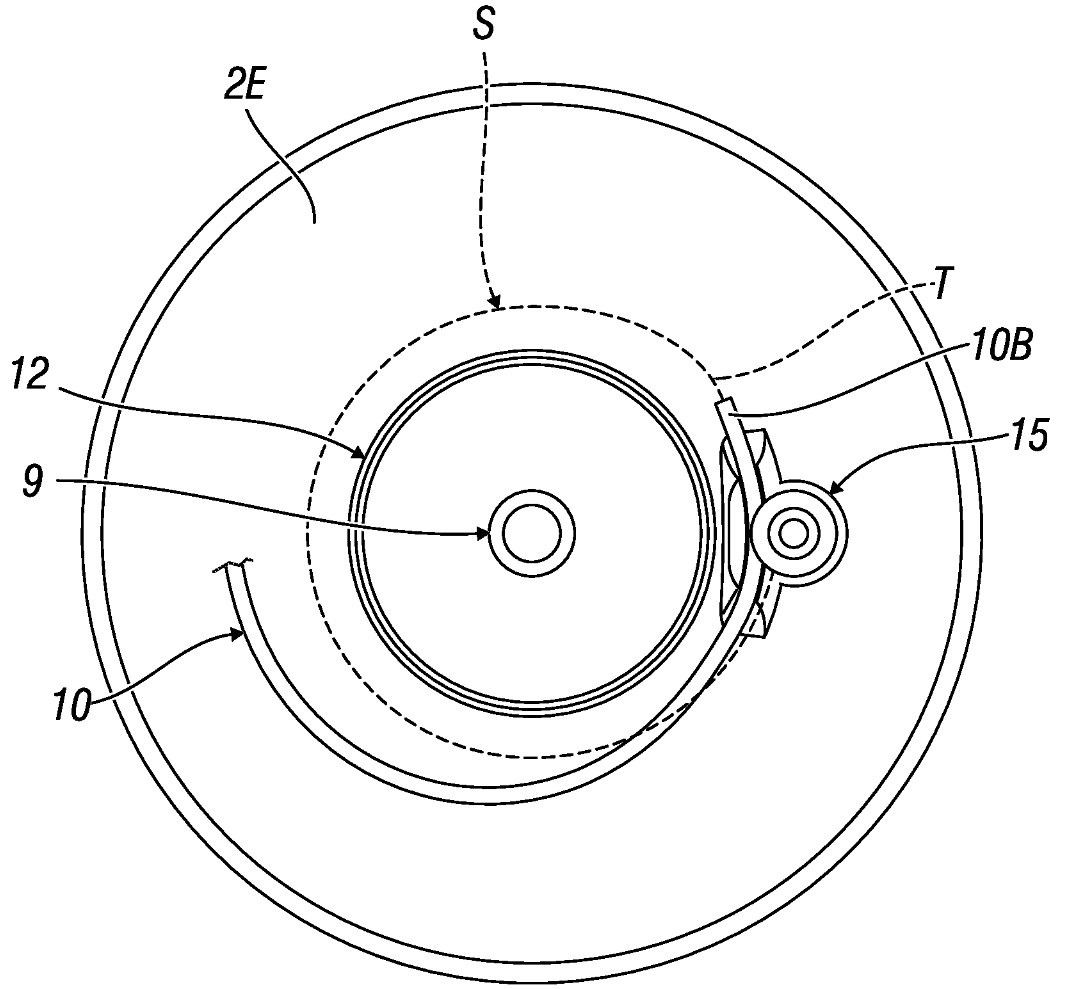
Figure 7:
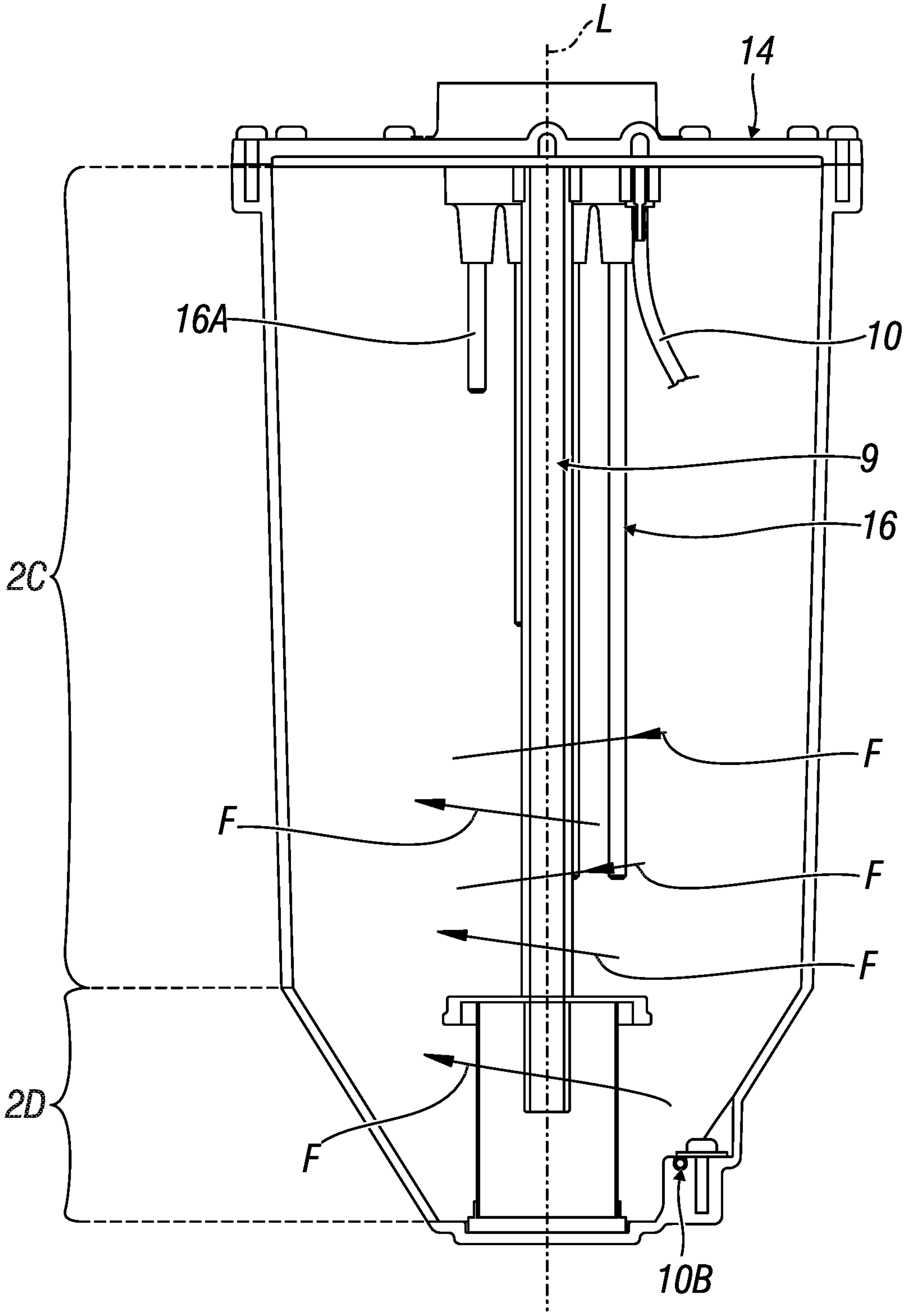
FIG. 7 is a schematic view in a longitudinal section of the tank of FIG. 2, which schematically highlights the ink flow inside the tank.

According to the invention, the end portion 10A of the ink inlet duct 10 is substantially tangent to a portion T (dashed in FIG. 6) of a circular sector S of the convergent-shaped side wall 2E, of the lower portion 2D of the tank, so as to create: a substantially swirling flow F (FIG. 7) in the ink supplied in the tank 2 from said inlet duct 10 or already present in the tank, and a mixing of the ink and/or the components thereof present in the tank.

In this context "substantially tangent" means that the end portion 10A can form with the portion T (dashed in FIG. 6) of the circular sector S of the side wall 2E, an angle between −10° (i.e. the end portion is slightly inclined towards the inside of the tank) and +10° (i.e. the end portion is slightly inclined towards the outside of the tank); however, it should be noted that the more this angle deviates from 0°, i.e. the less the end portion is tangent to the side wall 2E, the less will be the swirling flow F (FIG. 7) created in the ink present in the tank, and the worse will be the mixing of the ink components in the tank. It should also be noted that in this context "substantially tangent" means that the end portion 10B can also form, with a horizontal plane passing through the portion T of the circular sector S of the side wall 2E, an angle between −10° (i.e. the end portion is inclined towards the bottom of the tank) and +10° (i.e. the end portion is inclined towards the upper part of the tank); however, it should be noted that the more this angle deviates from 0°, i.e. the less the end portion is parallel to the circular sector S, the less will be the swirling flow F created in the ink present in the tank, and the worse will be the mixing of the ink components in the tank, with also the possibility that bubbles are created in the ink (in particular, if the end portion is oriented upwards).

In this context, "substantially swirling flow" means a flow which creates a rotary movement of the ink around the longitudinal axis L of the tank at least in the lower portion 2D of the tank, but preferably also in the upper part 2C of the tank, and in which the tangential speed of said swirling flow decreases going from the bottom of the tank towards the top of the same.

Preferably, the swirling flow creates a vortex coaxial with the longitudinal axis of the tank at least in the lower portion 2D of the tank.

According to the invention, the movement of the ink in the tank substantially affects the entire volume of the ink contained in the tank, primarily through a swirling flow, so as to have an extremely efficient ink mixing.

Preferably, the outlet opening 10B of the end portion 10A of the inlet duct 10 is provided at a distance D1 (FIG. 3A) from the bottom wall 2F of the tank between 80% and 20% of the overall height D2 of the converging part 2D of the tank 2, more preferably the distance D1 is between 60% and 30% of the height D2. In fact, it has been experimentally verified that by positioning the opening 10B at a certain distance from the bottom wall 2F of the tank, a good mixing of the ink and any sediments present on this bottom wall is obtained.

Furthermore, the opening 10A is preferably provided below or at the same distance from the opening 9A of the duct 9 for the ink outlet from the tank, i.e. the difference D4 (FIG. 3A) between the distance D3 of the opening 9A of the duct 9 and the distance D1 of the opening 10B of the duct 10 (measured from the centre of this opening 10A), from the bottom wall 2F of the tank is greater than or equal to 0 mm (D4=(D3−D1)>=0 mm). In fact, it has been experimentally verified that this positioning of the openings 10B and 9A allows good mixing of the ink leaving the opening 9A.

As indicated above, the opening 9A of duct 9 is provided above and near the bottom and closing wall 2F; preferably, the distance D3 (FIG. 3) of the opening 9A from the bottom wall 2F is between 1% and 25% of the overall inner height D12 (FIG. 3) of the tank, more preferably it is between 5% and 15% of this height D12, and even more preferably it is equal to about 10% of this height D12.

For example the opening 9A is provided at a distance D3 from the inner face of the bottom wall 2F of the tank, less than 25 mm, more preferably less than 20 mm.

Preferably, the tank comprises at its bottom wall 2F a filtering element 12 which has a body, for example cylindrical in shape, having: an upper wall 12A (FIG. 3A), a lower wall 12B and a filtering side wall 12C which connects the two walls 12A and 12B to each other. The upper wall 12A has a through and axial opening adapted to be penetrated in a sealed manner by an end portion 9B of the duct 9 for the ink outlet, so that the opening 9A is axially housed inside the filtering element.

Preferably the filtering element 12 rests against the bottom wall 2F of the tank and/or closes the tank at the bottom. Preferably the filtering element 12 is coaxial to a longitudinal axis L (FIG. 3A) of the tank.

Figure 3A:
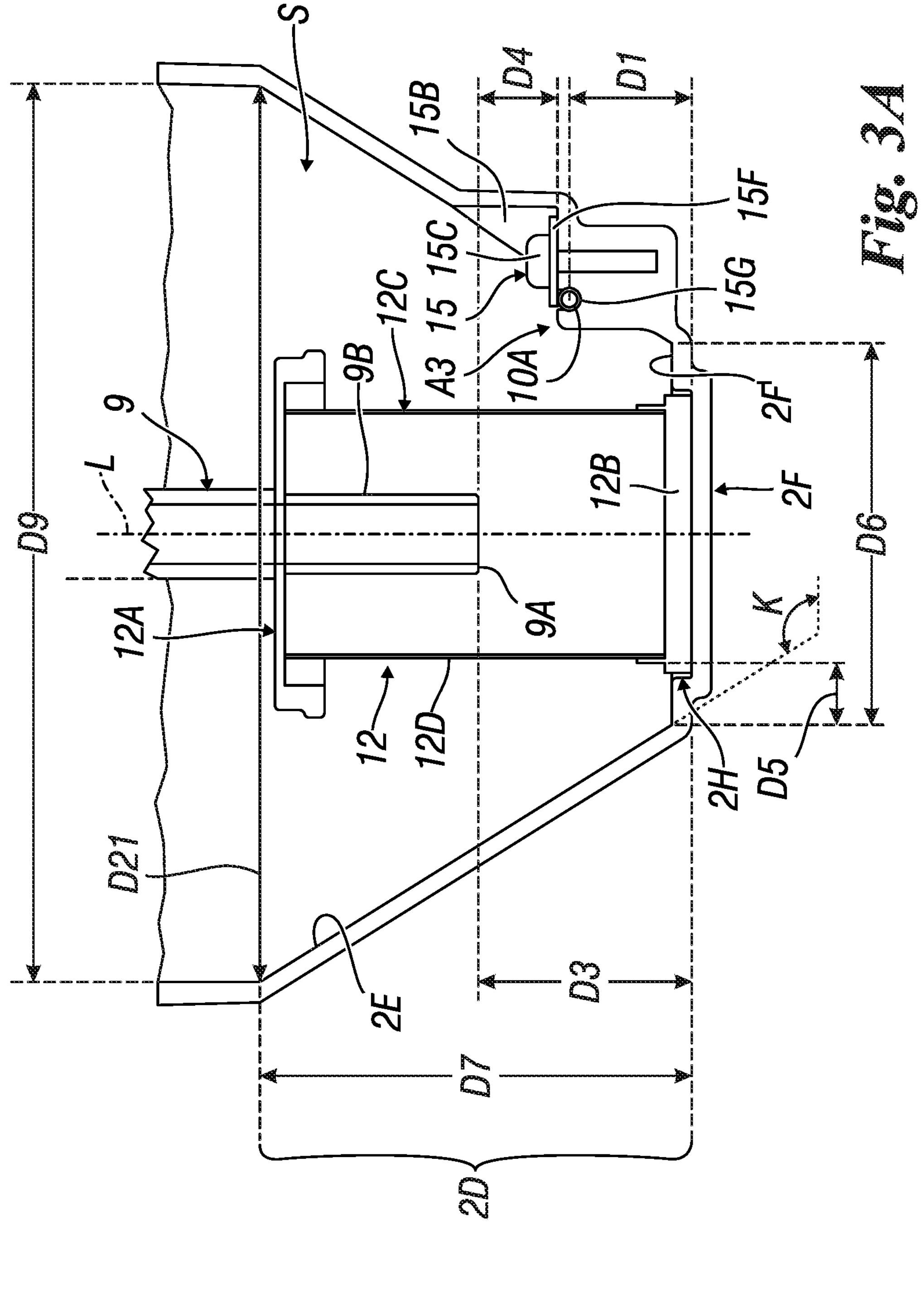

More specifically, preferably the lower wall 12B of the filtering element rests against the bottom wall 2F of the tank and is advantageously flush housed in a recessed seat 2H (FIG. 3A), suitably shaped and sized, obtained in the bottom wall 2F of the tank. Preferably the tank is substantially closed at the bottom by the filtering element 12, i.e. the inclined wall 2E of the tank, at the bottom, substantially reaches the filtering element 12, or it reaches a small distance D5 from the filtering element 12 (for example with D5 between 1% and 20% of the diameter D6 of the bottom wall 2F of the tank), so as to limit the portion in contact with the ink, of the bottom wall of the tank, to a limited size circular crown 2F' (FIG. 3A).

The side wall 12C of the filtering element 12 connects the upper and lower walls 12A, B to each other, the wall 12C comprises a filtering net, for example a wire net, and for example with openings having dimensions between 50 and 300 microns and more preferably between 100 and 200 microns, which develops throughout the extension of the side wall or at least one part of said wall. The side wall 12C preferably comprises stiffening parts 12D (FIG. 2) which connect the upper and lower walls 12A-B to each other.

The upper wall 12A of the filtering element may also include the filtering net.

Preferably, the filtering element has:

a height D7 (FIG. 3A) between 100% and 50% of the overall height D2 of the converging part 2D of the tank, and more preferably between 100% and 80% of D2, and a diameter D8 of its side wall 12C between 100% and 50% of the diameter D6 of the bottom wall 2F of the tank, more preferably between 100% and 80% of D6.

The filtering element has the function of protecting the components of the system to which the duct 9 sends the ink from particles of undesirable size which may be present in the ink.

It has also been experimentally verified that the filtering element, and in particular the fact that it has a substantially circular cross-sectional shape, creating a substantially annular space for the recirculation of the ink, helps in the formation of the swirling flow which is to be created in the tank, and in particular in its lower portion 2D, and in the space S (FIG. 3A) delimited by the converging wall 2E and the bottom wall 2F' of the tank and by the side wall 12C of the filtering element. Thanks to the presence of the filtering element 12 a sort of annular space S is created in the lower portion 2D of the tank, which channels the ink supplied into the tank, emitted by the opening 10B of the duct 10, in a swirling flow adapted to improve the ink mixing. Furthermore, the presence of the filtering element and its positioning coaxial to the tank prevents sediments from depositing in the middle of the bottom wall of the tank where, in the absence of the filtering element, the swirling flow of the ink has a lower speed.

Furthermore, the swirling flow of the ink in the lower part of the tank also has a function of cleaning the filtering side wall 12C of the filtering element 12, preventing particles formation and accumulation on the side wall itself, so as to improve the efficiency and the life of the filtering element.

Preferably, the body 2A of the tank 2 has an axial symmetry and also the upper portion 2C thereof has a circular cross-section, preferably having an inner diameter D9 (FIG. 3A) which is constant and equal to the maximum inner diameter D21 of the lower portion 2D of the tank having the side wall 2E converging towards the bottom wall 2F of the tank. Preferably, the height D2 of the lower portion is between 20% and 40% of the height D10 (FIG. 3) of the upper portion 2C of the tank, more preferably it is equal to about 30% of D10.

Preferably, the converging wall 2E is inclined by an angle K (FIG. 3A) between 100° and 170°, more preferably between 120° and 150°.

Preferably, the converging wall 2E has a regular cross-section, coaxial to the longitudinal axis L of the tank and decreasing towards the bottom of the tank, preferably circular or elliptical or polygonal (for example octagonal) in shape.

The tank has a ratio between the height/maximum diameter which is for example between 1:1 and 2.5:1 and more preferably it is equal to about 2:1.

The tank can for example have a volume between 0.21 and 61, more preferably between 0.51 and 21, and even more preferably equal to about 11.

Figure 4A:
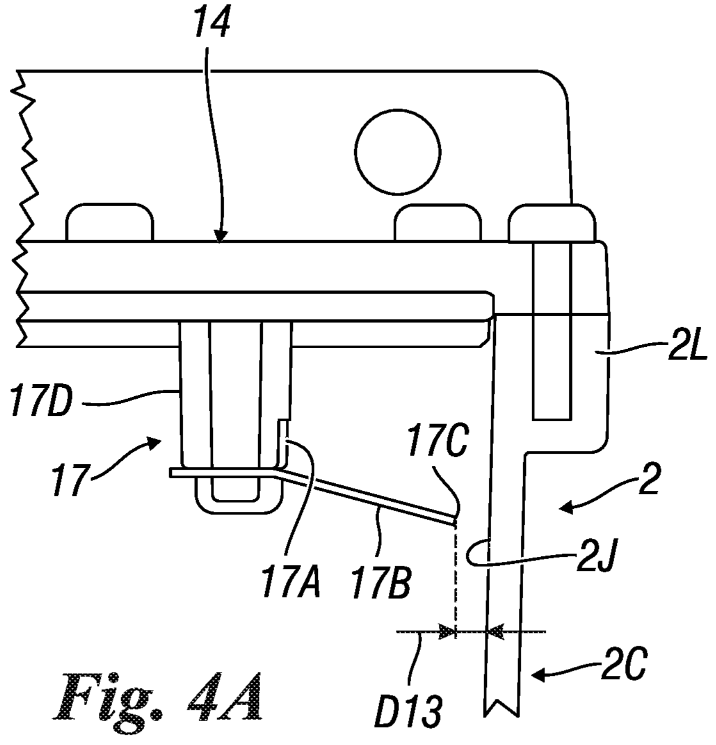
Figure 4:
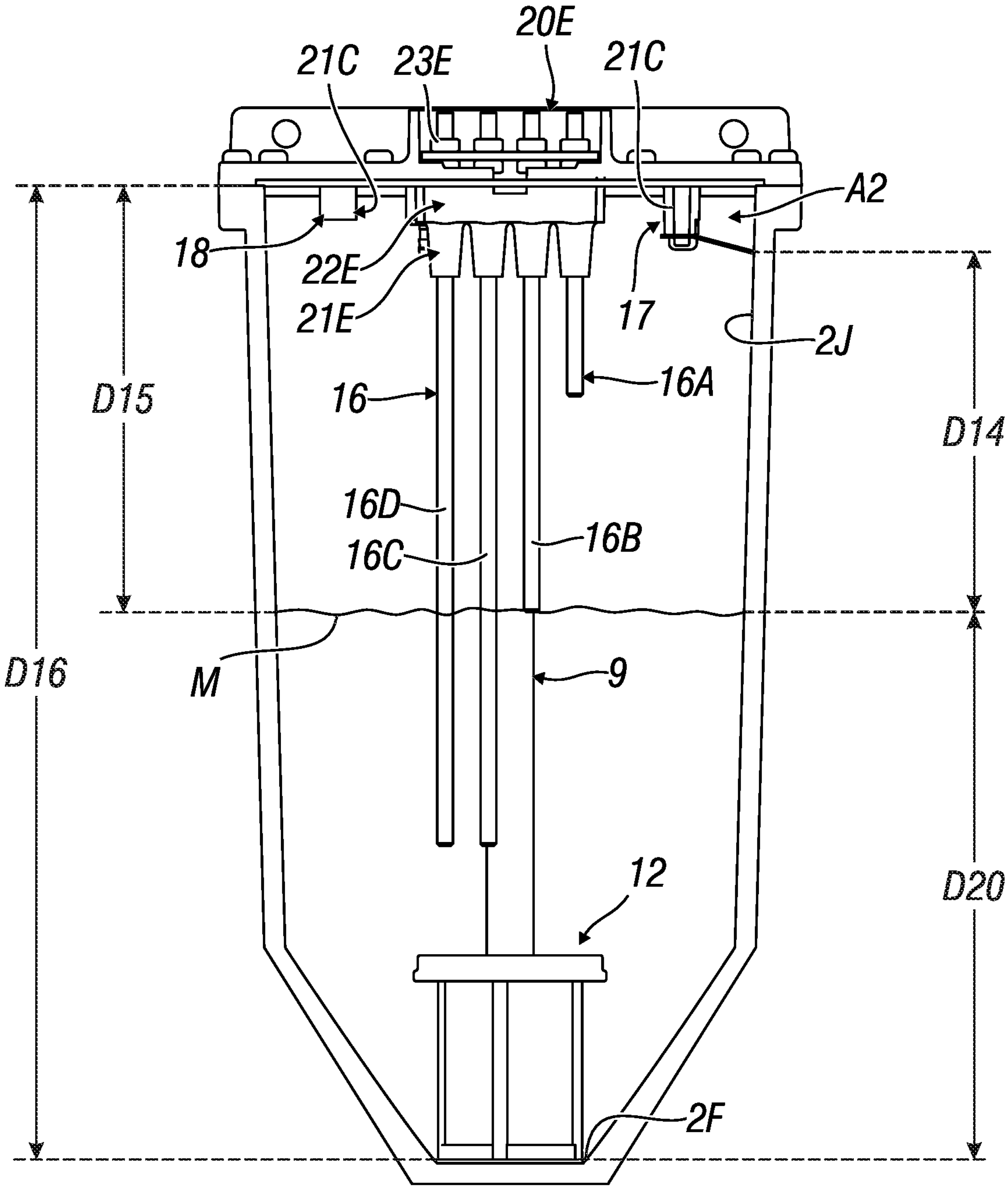

Preferably, the tank is sized and shaped in such a way as to provide a maximum level M for filling the tank which is provided at a distance D20 (FIG. 4) from the bottom 2F of the tank between 40% and 70% of the inner overall height D16 of the tank, so that the tank provides a wall 2J of the tank not occupied by the ink.

Preferably, the duct 9 for the ink outlet from the tank is coaxial to the longitudinal axis L (FIG. 3A) of the tank, and is a straight duct.

Preferably the inlet duct 10 is a flexible plastic tube, compatible with the ink.

Preferably the inner diameter of the duct 10 is between 1.0 mm and 5.0 mm.

Preferably the duct 10 has a substantially helical development, and forms an angle equal to about 360° or greater than 360° from its upper end portion to the lower one 10A.

As discussed below, the helical development of the duct 10 also simplifies the operations for handling a lid 14 which closes the top of the tank, because the duct 10 will get to have a greater length than the overall height of the tank D16 (FIG. 4); however, the technical problem could also be solved by using ducts having different characteristics, for example of the telescopic or extendable type.

The duct 10 could also be shaped like an extensible tube having a non-helical but, for example, substantially vertical development.

Figure 3B:
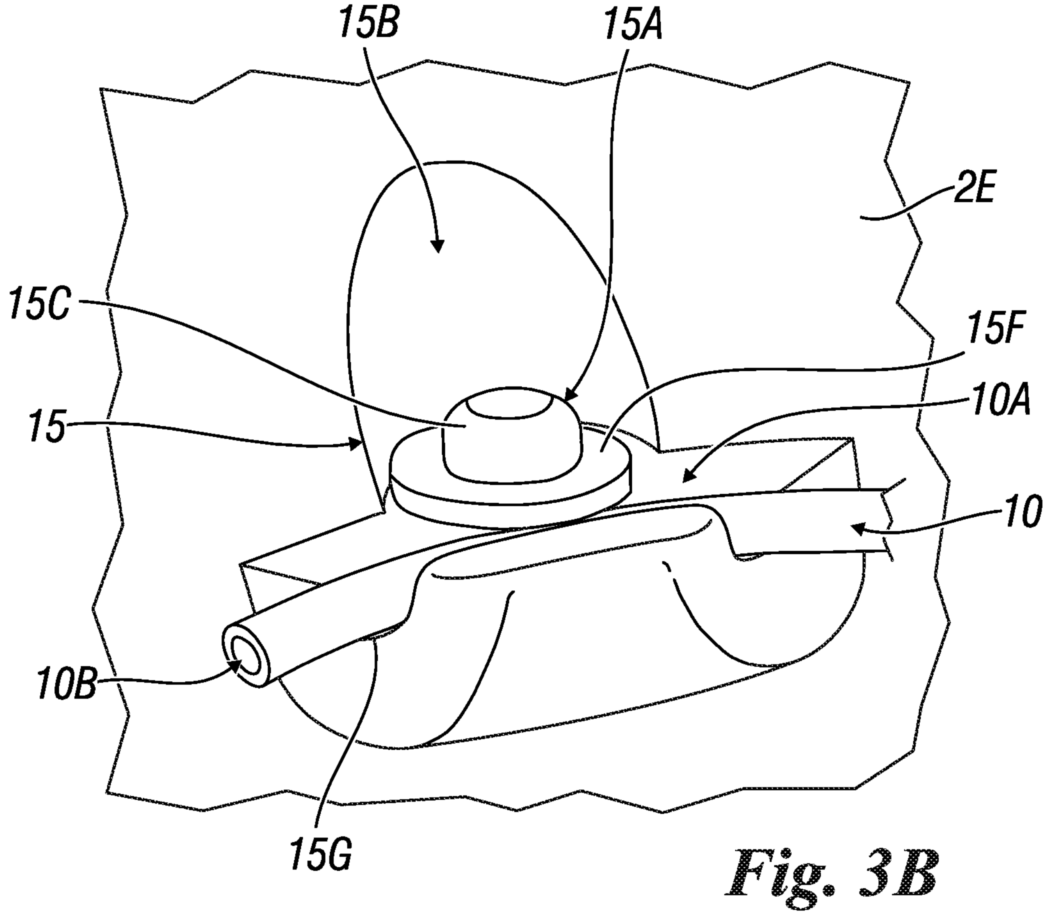

The tank also comprises means 15 for fixing the end portion 10A of the duct 10 in the desired position, tangent to the inclined wall 2E of the lower part 2D of the tank. The means 15 for example comprise a fixing element 15A (FIGS. 3A and 3B) and a shaped seat 15B adapted to at least partially house the end portion 10A, provided in the inclined wall 2E of the lower part 2D of the tank. As shown in FIG. 3B, the shaped seat 15B comprises, for example: a cavity 15G adapted to at least partially house the end portion 10A, which is blocked in said cavity 15G for example by a washer 15F of a head 15C of the fixing element 15.

The means for fixing the end portion 10A of the duct 10 in the desired position, tangent to the inclined wall 2E of the lower part 2D of the tank, could also have a different shape from that described above and comprise for example a tubular element tangent to the inclined wall 2E and rigidly constrained to said wall 2E in the position in which said end portion 10A is to be positioned, in which to insert the end portion.

Figure 2B:
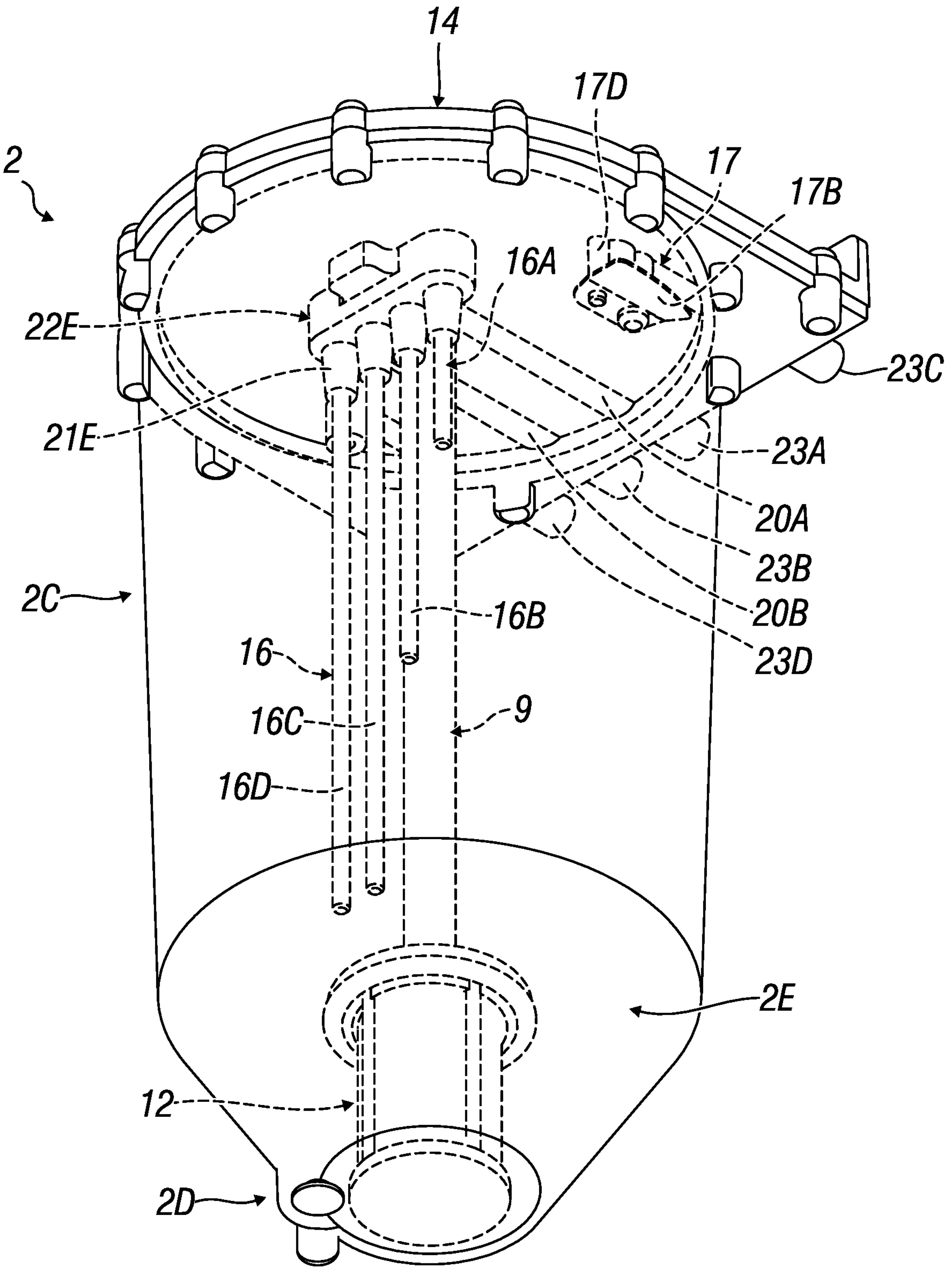
Figure 2C:
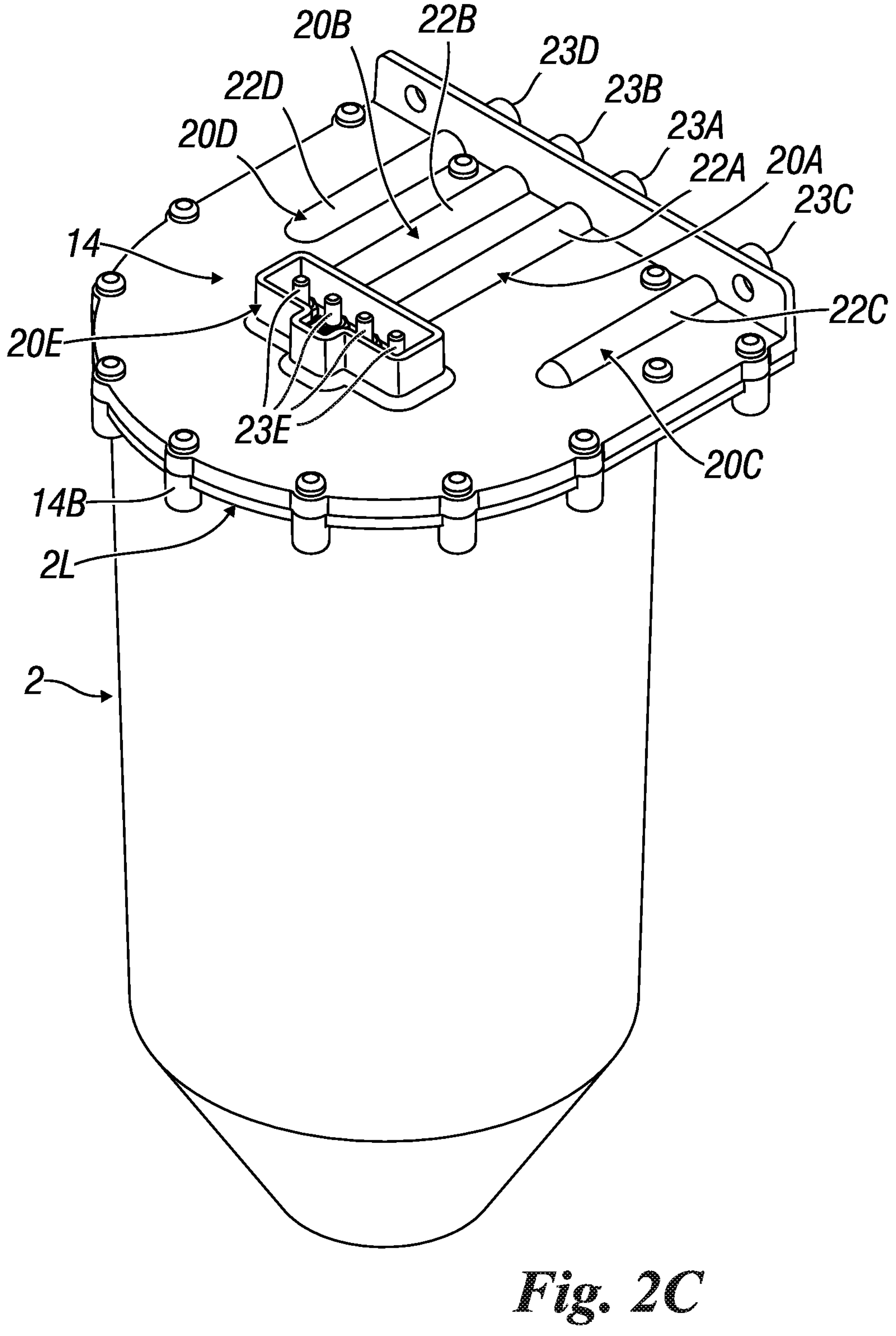
FIG. 2C is a schematic perspective view of the tank shown in FIGS. 2A and 2B, FIGS. 3 and 4 are two schematic views in longitudinal section of the tank of FIG. 2, FIGS. 3A and 4A are enlarged views of the details indicated by the arrows A1 and A2 of FIGS. 3 and 4.

The tank also comprises therein usual sensors 16 FIG. 2B) adapted to detect the level of the ink in the tank; these sensors comprise for example three bar-type sensors 16A-C, one (16C) for detecting a low ink level (for example equal to 25% of the tank volume), one (16B) for detecting the optimal ink level, and one (16A) for detecting a high level (for example equal to 85% of the tank volume). As usual for the person skilled in the art, the sensors 16 also include a sensor 16D adapted to supply a reference value.

The tank also comprises a usual ventilation duct 18 (FIG. 4) which is connected to the upper part of the tank and, in particular, to the tank lid 14, as discussed below.

The tank also comprises, as usual for the person skilled in the art, a duct 17 for recirculating the ink coming from the printhead of a continuous inkjet printer (CIJ).

Preferably the tank has a portion 17D (FIG. 4A) extending inside the tank and comprises a small lower opening 17A for supplying the recirculated ink into the tank. Preferably a guide element 17B, for example a sheet inclined towards the wall of the tank and towards the bottom of the tank, is provided below the opening 17A, which is adapted to guide the ink up to an inner side wall 2J of the upper portion 2C of the tank, at the upper edge thereof. Since the ink which is recirculated may contain a significant quantity of air in the form of bubbles or foam, the blade-shaped guide element 17B also has the function of separating the air from the returning ink. To this end, the free edge 17C of the sheet 17B of the guide element is provided at a distance D13 from the inner face of the wall 2J of the tank of one or more millimeters. Thanks to the guide element 17B, the ink which initially enters the tank vertically through the duct 17D is deflected laterally against the inner wall 2J of the tank, so as to create an ink film which flows along the inner wall 2J of the tank. In this way the recirculated ink flow which can have a high flow rate or a pulsating development is turned into a film that flows slowly towards the surface of the ink present in the tank.

To this end, preferably, the tank 2 is sized in such a way as to be able to position the guide element 17B in the tank at a significant distance D14 (FIG. 4) from the maximum level M for filling the tank with the ink, which allows the recirculated ink film to flow along a large surface of the inner wall 2J of the tank exposed to the air and which is not covered by the ink, so that the air bubbles and/or the foam present in the recirculated ink are eliminated and at the same time the recirculated ink comes into contact with the ink present in the tank smoothly avoiding splattering or splashing.

For example, as described above, the tank optimal filling level is provided at a distance D20 (FIG. 4) from the bottom 2F of the tank, this distance D20 between 40% and 70% of the tank overall inner height D16, so that the tank includes a wall portion 2J of the tank which is not occupied by the ink and along which the recirculated liquid can flow. This wall portion 2J has a height D15 (FIG. 4) which is between 30% and 60% of the overall height D16 of the tank, more preferably between 40% and 50% of the overall height D16 of the tank. Consequently, also the guide element 17B is positioned at a distance D14 from the tank optimal filling level M, and this distance D14 is between 30% and 60% of the overall height D16 of the tank, more preferably between 40% and 50% of the overall height D16 of the tank.

It should be noted that the duct 17, as usual for the person skilled in the art, can be used to also supply into the tank the ink and/or the components thereof which do not come from the printhead, but for example from the module 7, adapted to feed the tank 2 with the ink and/or ink components.

The tank comprises a top lid 14 adapted to close the tank itself. Preferably, the lid 14 comprises connecting means 14A, B for removably fixing it to the tank (2); for example screws 14A (FIG. 2) adapted to fix it to the upper edge 2L (FIG. 2C) of the tank, in seats 14B provided at said edge of the tank.

Advantageously, at least the duct 9 for the ink outlet from the tank 2, and the duct 10 for the ink and/or the components thereof inlet in the tank 2 are connected to the lid by means of dedicated connecting means 20A, 20B (FIG. 2) in one piece and/or associated with the lid; preferably, also the ventilation duct 18 and/or the duct 17 for the recirculating ink inlet are connected to the lid by means of dedicated connecting means 20D, 20C in one piece and/or associated with the lid; even more preferably the level sensors 16 are also connected to the lid by means of dedicated connecting means 20E in one piece and/or associated with the lid.

The connecting means 20A-D each comprise, for example: a first connecting element 21A-D that faces the inside of the tank, adapted to receive and sealingly connect one end of said ducts 9, 10, 17, 18 (only some of these first connecting elements can be seen in the Figures), an intermediate tubular element 22A-D adapted to connect the first connecting element 21A-D and, therefore, also the respective ducts 9, 10, 17, 18, to second connecting elements 23A-D provided outside the lid and the tank and adapted to connect the tank to the ducts 3A, 6A, 8A of the ink recirculating system that, as described above, are provided for the ink outlet from the tank 2, for the ink and/or the components thereof inlet into the tank and for the recirculated ink inlet into the tank, respectively.

Preferably, the connecting means 20E of the level sensors also comprises: a plurality of first elements 21E (FIG. 4) which face the inside of the tank, and are adapted to receive and sealingly connect one end of the level sensors 16, an intermediate element 22E (FIG. 4) for connecting the sensors 16 to a plurality of second connecting elements 23E provided outside the lid, for connecting the sensors to a control unit (not shown) of the printer.

Thanks to this particular conformation of the lid, in which, preferably, all the ducts and/or connections of the tank are grouped in the lid 14 of the tank, the assembly and/or maintenance of the tank are extremely simplified and speeded up. In fact, the tank 2 together with its lid 14 forms a single and compact module having all the connections necessary for its connection to the other modules of the ink recirculating system of the inkjet printer.

The operation of the ink recirculating system for an inkjet printer is of the usual type for the person skilled in the art and will therefore not be described in detail below.

As far as the tank 2 is concerned, the operation is as follows.

As usual for the person skilled in the art, the ink recirculating system 1 comprises a circuit C1 for recirculating and mixing the ink present in the tank (FIG. 1) which allows the ink present in the tank 2 to be moved and mixed. When the printer is active, this circuit C1 takes the ink from the tank through the duct 9 and through the pump 11, feeds it back into the tank 2, through the duct 10 of the tank, thus ensuring homogeneous characteristics of the ink present in tank 2.

More specifically, the pump 11 takes the ink from the tank, feeds it to the outlet line 3A, which is external and connected to the tank, and feeds it back into the tank 2, through the inlet line 6A, external and connected to the tank, and the duct 10 inside the tank. Downstream of the pump an ink filter 18 and a valve member 19 (for example comprising a hydraulic limiter) are also preferably included.

Thanks to the characteristics of the tank illustrated so far, this recirculation of the ink allows to obtain an efficient movement of the ink in the tank and its optimal mixing.

Under normal operating conditions, the flow rate P of the ink generated by the pump 11 is between: 1 m/s and 15 m/s, more preferably it is between 3 m/s and 7 m/s, and even more preferably it is equal to about 5 m/s; where said flow rate leaving the opening 10B is calculated by dividing the volume of the ink fed in the time unit (1 second) by the pump 11 to the duct 10 by the cross-section of the outlet opening 10B of said duct 10.

It has been experimentally verified that these flow rate values, indicated hereinafter as nominal flow rate values, help generating the desired swirling flow in the tank, and the consequent desired ink mixing.

It should be noted that in specific situations, the flow rate values listed above can be decreased or increased.

For example, when the printer is switched off for a short time, for example during the night, it is usual to control the printer so that, for example every hour, an ink mixing cycle is performed in the tank 2.

On the other hand, when the printer is switched off for a long time (for example due to a breakdown, or for maintenance or when the plant is starting up) and if a pigmented ink is used, the pigments can accumulate on the bottom of the tank 2 forming a layer of sediments which must be dispersed back into the ink when the printer is reactivated, it is usual to check the printer so that a mixing of the ink is carried out in the tank, before feeding the ink to the printhead.

As usual for the person skilled in the art, when printing is to be carried out, a part of the ink flow taken by the pump 11, circulating in the circuit C1 described above, is directed, for example through the valve member 19, to the printhead 5, through a supply line 5D, 5A and the relative connecting module 4B. Only a part of the flow rate of the ink moved by the pump 11 is directed to the printhead, for example less than 20%, and preferably about 5%, of the flow rate of the ink generated by the pump 11 is fed to the printhead 5.

When the ink has to be added to the tank 2 (for example because it has been consumed by the printhead and/or has partly evaporated) the ink and/or the components thereof, as conventional for the person skilled in the art, are taken from the refill module 7 and through the supply line or lines 7A, 7B 8A and the connecting module 4D, are fed to the inlet duct 17 provided in the upper part of the tank 2.

It is stressed that the embodiment described so far has been provided by way of example and that variants are possible, all falling within the same inventive concept.

Likewise, for example, the invention relates to generic inkjet printers and not only to continuous inkjet printers.

According to a further variant, the tank could have a plurality of ink supply ducts 10, identical to the previously described duct 10 and having end portions 10A angularly spaced apart along the wall 2E and all tangent to said wall.

It should also be noted that the technical solutions and/or the conformation relating to the lid 14, and/or to the filtering element 12, and/or to the second inlet duct 17 can also be adopted individually, or in combination with each other, even in tanks adapted to contain known types of ink, and having different technical characteristics from those described so far.

Therefore, the invention also relates to an ink tank for an inkjet printer, comprising:

a body 2A delimiting a cavity 2B, an outlet duct 9 for the outlet of the ink from the tank, provided inside the cavity 2B of the tank 2, wherein preferably said outlet duct 9 is coaxial to a longitudinal axis L of the tank, and comprises an opening 9A for the inlet of the ink to be moved out of the tank, preferably provided above and near said bottom and closing wall 2F;

a first duct 10 for the inlet in the tank 2 of the ink to be mixed, comprising:

an end portion 10A (FIG. 5) having an opening 10B for the ink supply to the tank 2, characterized in that the tank comprises therein and at the bottom wall 2F thereof a filtering element 12, and in that said opening 9A of the outlet duct 9 is housed inside said filtering element 12, so as to protect the components of the system to which the duct 9 supplies the ink, from particles of undesirable dimensions that may be present in the ink itself.

Wherein, preferably, the filtering element 12 comprises one or more of the following features:

the filtering element 12 has a body having a substantially circular cross-section, and/or the filtering element 12 rests against the bottom wall 2F of the tank 2, and/or it closes the tank 2 at the bottom, and/or the filtering element 12 is coaxial to a longitudinal axis L of the tank;

and/or the filtering element 12 having a body, for example cylindrical in shape, has: an upper wall 12A, a lower wall 12B and a side wall, wherein, preferably, the upper wall 12A has a through and axial opening adapted to be penetrated in a sealed manner by an end portion 9B of the duct 9 for the ink outlet, so that the opening 9A is axially housed inside the filtering element;

wherein preferably the lower wall 12B of the filtering element rests against the bottom wall 2F of the tank and is preferably flush housed in a recessed seat 2H, obtained in the bottom wall 2F of the tank;

and/or the tank 2 is substantially closed at the bottom by the filtering element 12 and, preferably the inclined wall 2E of the tank, at the bottom, substantially reaches the filtering element 12, or it reaches a small distance D5 from the filtering element 12, so as to limit the portion in contact with the ink, of the bottom wall of the tank, to a limited size circular crown 2F';

and/or the filtering element 12 has a height D7 between 100% and 50% of the overall height D2 of the converging part 2D of the tank, and more preferably between 100% and 80% of D2, and a diameter D8 of its side wall 12C between 100% and 50% of the diameter D6 of the bottom wall 2F of the tank, more preferably between 100% and 80% of D6 of the bottom wall 2F of the tank.

The invention claimed is:

1. An ink recirculating system for an inkjet printer, comprising:

a) a tank for said ink, comprising:

a body delimiting a cavity having an upper and a lower portion, wherein:

the lower portion comprises a side wall, which converges towards a bottom and closing wall of the tank, and has a circular, decreasing cross-section;

an outlet duct for the outlet of the ink from the tank, provided inside the cavity of the tank;

wherein said outlet duct is coaxial to a longitudinal axis of the tank;

an inlet opening for the ink to be moved out of the tank, provided above and near said bottom and closing wall;

an inlet duct for supplying the inlet in the tank to be mixed, comprising:

an end portion having an opening for the ink supply to the tank, wherein said end portion of the inlet duct is provided in the lower portion of the tank, in correspondence with a circular sector;

b) a pump in fluid communication with said outlet duct and said inlet duct, to convey under pressure an ink present in the tank from said outlet duct to said inlet duct;

wherein the end portion of the first ink inlet duct is substantially tangent to a portion of the circular sector of the side wall, of the lower portion of the tank, such as to create a substantially swirling flow in the ink present in the tank and a mixing of the ink or components thereof present in the tank, wherein the substantially swirling flow in the ink starts from the lower portion of the tank.

2. The ink recirculating system according to claim 1, further including a ventilation duct.

3. The ink recirculating system according to claim 1, further including at least one sensor adapted to detect the level of ink in the tank.

4. The ink recirculating system according to claim 1, wherein the opening (10B) of the end portion (10A) of the inlet duct (10) is provided at a distance (D1) from the bottom wall (2F) of the tank between 80% and 20% of the overall height (D2) of the converging sidewall (2E) of the tank (2).

5. The ink recirculating system according to claim 4, wherein the distance (D1) is between 30% and 60% of the height (D2).

6. The ink recirculating system according to claim 1, wherein the opening (10B) of the end portion (10A) of the inlet duct (10) is provided below or at the same distance as the opening (9A) of the outlet duct (9) for the ink outlet from the tank.

7. The ink recirculating system according to claim 1, wherein a distance (D3) of said opening (9A) of the outlet duct (9) from the bottom wall (2F) is between 1% and 25% of the overall inner height (D12) of the tank.

8. The ink recirculating system according to claim 7, wherein the distance (D3) is between 5% and 15% of this height (D12).

9. The ink recirculating system according to claim 8, wherein the distance (D3) is equal to about 10% of the overall inner height (D12).

10. The ink recirculating system according to claim 1, wherein the tank comprises therein and at the bottom wall thereof a filtering element and in that said opening of the outlet duct is housed inside said filtering element, so as to protect components of the system to which the outlet duct supplies the ink.

11. The ink recirculating system according to claim 1, characterized in that the flow rate (P) of the ink generated by the pump (11) is between: 1 m/s and 15 m/s, wherein said flow rate leaving the opening (10B) is calculated by dividing the volume of the ink fed in the time unit by the pump (11) to the duct (10) by the cross-section of the outlet opening (10B) of said duct (10).

12. The ink recirculating system according to claim 11, wherein the flow rate (P) of the ink generated by the pump (11) is between 3 m/s and 7 m/s.

13. The ink recirculating system according to claim 12, characterized in that the flow rate (P) of the ink generated by the pump (11) is equal to about 5 m/s.

14. The ink recirculating system according to claim 1, wherein the tank comprises therein and at the bottom wall thereof a filtering element and in that said opening of the outlet duct is housed inside said filtering element, so as to protect components of the system to which the outlet duct supplies the ink, wherein the filtering element comprises one or more of the following features:

- the filtering element has a body having a substantially circular cross-section; or
- the filtering element rests against the bottom wall of the tank, or
- the filtering element closes the tank at the bottom; or
- the filtering element is coaxial to a longitudinal axis of the tank; or
- the filtering element having a body that is cylindrical in shape including an upper wall, a lower wall and a side wall.

15. The ink recirculating system according to claim 14, wherein the upper wall has an opening which extends axially through the upper wall and is adapted to be penetrated in a sealed manner by an end portion of the outlet duct for the ink outlet, so that the opening is axially housed inside the filtering element.

16. The ink recirculating system according to claim 1, wherein a lower wall of a filtering element rests against the bottom wall of the tank and is flush housed in a recessed seat, obtained in the bottom wall of the tank.

17. The ink recirculating system according to claim 10, wherein the tank is substantially closed at the bottom by the filtering element, and the inclined wall of the tank, at the bottom, substantially reaches the filtering element, or it reaches a small distance from the filtering element, so as to limit the portion in contact with the ink, of the bottom wall of the tank, to a limited size circular crown.

18. The ink recirculating system according to claim 10, wherein the filtering element has a height between 100% and 50% of the overall height of the lower portion of the tank.

19. The ink recirculating system according to claim 10, wherein the filtering element has a height between 100% and 80% of the overall height, and a diameter of its side wall between 100% and 50% of the diameter of the bottom wall of the tank.

20. The ink recirculating system according to claim 10, wherein the side wall is between 100% and 80% of the diameter of the bottom wall of the tank.

21. The ink recirculating system according to claim 1, characterized that the tank (2) comprises one or more of the following features:

- the body (2A) of the tank (2) has an axial symmetry and also the upper portion (2C) thereof has a circular cross-section, having an inner diameter (D9) which is constant and equal to the maximum inner diameter (D10) of the lower portion (2D) of the tank having the side wall (2E) converging towards the bottom wall (2F) of the tank; or
- the height (D2) of the lower portion is between 20% and 40% of the height (D10) of the upper portion (2C) of the tank; or
- the height (D2) of the lower portion is between 20% and 40% of the height (D10) of the upper portion (2C) of the tank is equal to about 30% of the height (D10); or
- the converging wall (2E) is inclined by an angle (K) between 100° and 170°; or
- the converging wall (2E) is inclined by an angle (K) between 120° and 150°; or
- the tank has a ratio between the maximum height/diameter which is between 1:1 and 2.5:1; or the tank has a ratio between the maximum height/diameter which is between equal to about 2:1; or
- the tank has a volume between 0.21 and 61; or
- the tank has a volume between 0.51 and 21; or
- the tank has a volume equal to about 11; or
- the tank is sized and shaped in such a way as to provide an optimal level (M) for filling the tank which is provided at a distance (D20) from the bottom (2F) of the tank between 40% and 70% of the overall inner height (D16) of the tank, so that the tank provides a wall (2J) of the tank not occupied by the ink, which has a height (D15) which is between 20% and 60% of the overall height (D16) of the tank; or
- the tank is sized and shaped in such a way as to provide an optimal level (M) for filling the tank which is provided at a distance (D20) from the bottom (2F) of the tank between 40% and 70% of the overall inner height (D16) of the tank, so that the tank provides a wall (2J) of the tank not occupied by the ink, which has a height (DIS) which is between 30% and 40% of the overall height (D16) of the tank; or
- the duct (9) for the ink outlet from the tank is coaxial to the longitudinal axis (L) of the tank, and is a straight duct; or
- the inlet duct (10) is a flexible plastic tube; or
- the inlet duct (10) has an inner diameter between 1.0 mm and 5.0 mm; or the inlet duct (10) has a substantially helicoidal course, and forms an angle equal to about 360° or greater than 360° from its upper end portion to the lower one (10A); or the converging wall (2E) has a regular cross-section, coaxial to the longitudinal axis (L) of the tank and decreasing towards the bottom of the tank; or the converging wall (2E) has a circular or elliptical or polygonal in shape.

22. The ink recirculating system according to claim 1, characterized in that the tank (2) comprises means (15) for fixing the end portion (10A) of the inlet duct (10) in the desired position, tangent to the inclined wall (2E) of the lower part (2D) of the tank, wherein the fixing means (15) comprise a fixing element (15A) and a shaped seat (15B) adapted to at least partially house said shaped element (15A), provided in the inclined wall (2E) of the lower part (2D) of the tank and forming a recess in said sloping wall.

23. The ink recirculating system according to claim 1, characterized that the tank (2) comprises:

at least one second inlet duct (17) for the inlet into the tank of: ink and/or ink components, in fluid communication:

with a inkjet printer printhead (5), to convey the ink not used by said printhead (5) into the tank; or with a refill module (7), adapted to supply the ink or the components thereof consumed during printing to the tank (2); and in that said second inlet duct (17) comprises one or more of the following features:

said second inlet duct (17) provides an opening (17 A) for discharging the liquid recirculating in said second duct (17) into the tank, wherein said opening (17 A) is provided in the upper portion (2C) of the tank and above an optimal level (M) of the ink in the tank, or the second inlet duct (17) provides an opening (17 A) for discharging the liquid recirculating in said second duct (17) into the tank, and a guide element (17B) comprising a sheet inclined towards the bottom of the tank, adapted to guide said liquid up to an inner side wall (2J) of the upper portion (2C) of the tank, wherein a free edge (17C) of said guide element is provided at a distance (D13) from the inner face of the wall (2J) of the tank between 1 mm and 5 mm, so as to create a film of said liquid which flows along the inner wall (2J) of the tank; or the second inlet duct (17) provides an opening (17 A) for discharging the liquid recirculating in said second duct (17) into the tank, wherein said opening (17 A), and in particular the guide element (17B) thereof, is provided at a significant distance (D14) from the tank maximum optimal filling level (M), which allows a film of the liquid fed into the tank to flow from the second duct (17) along a wide surface of the inner wall (2J) of the tank exposed to the air and not covered by the ink, wherein the tank is sized in such a way as to provide a height (D15) of the wall (2J) of the tank not occupied by the ink and along which the liquid can flow which is between 20% and 60% of the overall height (D16) of the tank and wherein said discharge opening (17 A) is positioned at a distance (D14) from the tank optimal filling level (M) between 20% and 60% of the overall height (D 16) of the tank.

24. The ink recirculating system according to claim 1, characterized in that the tank (2) comprises a lid (14) adapted to close the top of the tank itself, in that said lid (14) comprises connecting means (14A) for removably fixing it to the tank (2);

and in that said lid (14) comprises first connecting means (20A) (20B) for connecting to the lid at least the duct (9) for ink outlet from the tank (2), and also at least the first duct (10) for the ink inlet in the tank (2);

and in that said lid comprises one or more of the following features:

the lid comprises further connecting means (20D) for also connecting a ventilation duct (18) to the lid; or the lid comprises further connecting means (20C) for connecting a second duct (17) for the inlet of the ink or the components thereof to the lid; or the lid comprises further connecting means (20E) for connecting at least one sensor (16) to the lid to detect the level (16) of the ink in the tank; or at least one of said connecting means (20A-E) is at least partially made in one piece or associated with the lid (14); or at least one of said connecting means (20A-D) for said ducts (9), (10), (17), (18) comprises:

a first connecting element (21A-D) that faces the inside of the tank adapted to receive and sealingly connect one end of said ducts (9), (10), (17), (18);

at least one intermediate tubular element (22A-D) adapted to connect said first connecting element (21A-D) and therefore also the respective ducts (9), (10), (17), (18), to second connecting elements (23A-D) provided outside the lid and adapted to connect the tank to ducts (3A), (6A), (8A) of the ink recirculating system, provided, respectively, for the ink outlet from the tank (2), for the ink and (7A) and the components (7B) thereof feeding into the tank and for feeding the recirculated ink into the tank; or the connecting means (20E) of at least one sensor (16) comprise at least one first element (21E) which faces the inside of the tank, adapted to receive and sealingly connect one end of the level sensor (16), an intermediate element (22E) for connecting the sensor (16) to at least one second connecting element (23E) provided outside the lid.

25. An inkjet printer comprising an ink recirculating system according to claim 1.

* * * * *